US 7,611,190 B1

(12) United States Patent
Elliott et al.

(10) Patent No.: US 7,611,190 B1
(45) Date of Patent: Nov. 3, 2009

(54) VEHICLE DOOR ARTICULATING AND SLIDING MECHANISM

(75) Inventors: Adrian Nicholas Alexander Elliott, Dearborn, MI (US); Jason Falenski, Berkley, MI (US); Justin Thales Johnson, Idaho Falls, ID (US); Dave Michael Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/391,427

(22) Filed: Feb. 24, 2009

(51) Int. Cl.
*B60J 5/06* (2006.01)

(52) U.S. Cl. .................. 296/155; 296/146.12; 49/248

(58) Field of Classification Search ............. 296/146.1, 296/146.11, 146.12, 155; 49/246, 248, 250
See application file for complete search history.

(56) References Cited

U.S. PATENT DOCUMENTS

| | | | |
|---|---|---|---|
| 3,051,999 A * | 9/1962 | Schimek | 49/212 |
| 3,075,803 A * | 1/1963 | Wilfert | 49/212 |
| 3,628,216 A | 12/1971 | Savell | |
| 4,025,104 A * | 5/1977 | Grossbach et al. | 296/155 |
| 4,135,760 A * | 1/1979 | Grossbach | 296/155 |
| 4,945,677 A | 8/1990 | Kramer | |
| 5,398,988 A | 3/1995 | DeRees et al. | |
| 5,507,119 A * | 4/1996 | Sumiya et al. | 49/218 |
| 5,921,613 A | 7/1999 | Breunig et al. | |
| 6,183,039 B1 * | 2/2001 | Kohut et al. | 296/155 |
| 6,793,268 B1 | 9/2004 | Faubert et al. | |
| 6,826,869 B2 * | 12/2004 | Oberheide | 49/360 |
| 6,926,342 B2 * | 8/2005 | Pommeret et al. | 296/155 |
| 6,997,504 B1 * | 2/2006 | Lang et al. | 296/146.11 |
| 7,000,977 B2 * | 2/2006 | Anders | 296/155 |
| 7,168,753 B1 * | 1/2007 | Faubert et al. | 296/146.12 |
| 7,243,978 B2 * | 7/2007 | Mather et al. | 296/155 |
| 7,393,044 B2 * | 7/2008 | Enomoto | 296/155 |
| 2005/0146159 A1 * | 7/2005 | Shen et al. | 296/155 |
| 2007/0085374 A1 * | 4/2007 | Mather et al. | 296/155 |
| 2009/0072583 A1 * | 3/2009 | Elliott et al. | 296/155 |

* cited by examiner

*Primary Examiner*—Glenn Dayoan
*Assistant Examiner*—Gregory Blankenship
(74) *Attorney, Agent, or Firm*—Gregory Brown; Price, Heneveld, Cooper, DeWitt & Litton, LLP (57) ABSTRACT

A vehicle door articulating and sliding mechanism is provided that includes a swing arm pivotally mounted via a first bracket to a vehicle structure at one end and a sliding assembly comprising a rotating second bracket mounted at an opposite end of the swing arm. The sliding assembly is slidably engaged to a vehicle door. The mechanism also includes a first flexible link at least partially encircling a first sprocket connected to the vehicle structure and a second sprocket fixed to the vehicle door. The mechanism further includes a second flexible link fixed to the vehicle door at one end and fixed to the vehicle structure at the opposite end. The second flexible link at least partially encircles a cam, wherein the first flexible link and cam provide a catch that engages the cam to accelerate movement of the door during opening.

19 Claims, 8 Drawing Sheets

VEHICLE DOOR ARTICULATING AND SLIDING MECHANISM

FIELD OF THE INVENTION

The present invention generally relates to vehicle door movement control devices and, more particularly, to a mechanism for enabling vehicle door articulation, such as for example, in a pick-up truck, such that the mechanism permits opening and closing of a door without requiring the opening of an adjacent door.

BACKGROUND OF THE INVENTION

As is known in the art, automobile designs are governed by a variety of ergonomic and operational factors. For doors and other such components, the design is generally based on ergonomic factors such as exterior appearance, and the location and visibility of hinges, latches and adjacent components, and operational factors such as the ingress/egress opening provided, the maximum clearance required for opening/closing a door, and crash performance.

For pick-up trucks, sport-utility vehicles (SUVs) and other such vehicles which are designed to accommodate ingress/egress of several passengers and also provide means for transport of large goods, the ingress/egress opening and maximum clearance required for opening/closing a door can be of particular importance. For example, a pick-up truck having front and back driver/passenger doors may include a C-pillar mounted rear door which pivots relative to the C-pillar in a similar manner as the A-pillar mounted front door to thus provide a relatively large and unobstructed ingress/egress opening without the intermediate B-pillar. Due to the large size, in particular the door length (width when open), of a typical pick-up truck, driver/passenger ingress/egress can become particularly restrictive, if not impossible, if a vehicle is parked adjacent to the truck and is sufficiently close to prevent a person from boarding or loading to enter the area between the front and rear doors (when open), invariably known as parking lot entrapment. A typical truck with front and back (rear) doors will include a B-pillar mounted rear door, which pivots relative to the B-pillar in a manner similar to the A-pillar mounted front door. This design does not suffer to the same extent from parking lot entrapment, but is still restricted as regards ingress/egress due to limitations of the door opening when parked adjacent to other vehicles.

In an effort to address such parking lot entrapment concerns, a host of sliding or articulating rear door designs, such as the design disclosed in U.S. Pat. No. 6,183,039 to Kohut, has been proposed. Many of the proposed articulating door systems are relatively complex in design and often susceptible to failure. More recently, a vehicle door belt and cam articulating mechanism has been proposed as disclosed in U.S. application Ser. No. 12/348,566 filed on Jan. 5, 2009, the disclosure of which is hereby incorporated herein by reference.

It is therefore desirable to provide for a mechanism for permitting opening and closing of a vehicle door that does not require opening of an adjacent door, and with the mechanism providing ease of operation.

SUMMARY OF THE INVENTION

In accordance with one aspect of the present invention, drawbacks and deficiencies of prior art articulating door mechanisms are overcome by providing a vehicle door articulating and sliding mechanism including a swing arm pivotally mounted via a first bracket to a vehicle structure at one end thereof, and a sliding assembly comprising a rotating second bracket mounted at an opposite end of the swing arm, wherein the sliding assembly is slidably engaged to a vehicle door. The mechanism also includes a first flexible link at least partially encircling a first sprocket connected to the vehicle structure and a second sprocket fixed to the vehicle door. The mechanism further includes a second flexible link fixed to the vehicle door at one end and fixed to the fixed to the vehicle structure at the opposite end. The second flexible link at least partially encircles a cam, wherein the second flexible drive and cam provide a catch that engages the cam to accelerate movement of the door during opening.

According to another aspect of the present invention, a vehicle door articulating and sliding mechanism is provided that includes a swing arm pivotally mounted via a first bracket to a vehicle structure at one end thereof and a sliding assembly comprising a rotating second bracket mounted at an opposite end of the swing arm, wherein the sliding assembly is slidingly engaged to a vehicle door. The mechanism also includes a first flexible link at least partially encircling a first sprocket connected to the vehicle structure and a second sprocket fixed to the vehicle door. The mechanism further includes a second flexible link fixed to the vehicle door at one end and fixed to the vehicle structure at the opposite end, the second flexible link at least partially encircling a cam. The mechanism further includes a catch member that moves with the second flexible link and engages the cam to accelerate movement of the door during opening and decelerate movement of the door during closing.

According to a further aspect of the present invention, a vehicle component articulating and sliding mechanism is provided that includes a swing arm pivotally mounted via a first bracket to a vehicle structure at one end thereof and a sliding assembly comprising a rotating second bracket mounted at an opposite end of the swing arm, wherein the sliding assembly is slidably engaged to a vehicle component. The mechanism also includes a first flexible link at least partially encircling a first sprocket connected to the vehicle structure and a second sprocket fixed to the vehicle component. The mechanism further includes a second flexible link fixed to the vehicle component at one end and fixed to the vehicle structure at the opposite end, said second flexible link at least partially encircling a cam, wherein the second flexible link and cam provide a catch that engages the cam to accelerate movement of the vehicle component in one direction and to decelerate movement of the vehicle component in an opposite direction.

These and other aspects, objects, and features of the present invention will be understood and appreciated by those skilled in the art upon studying the following specification, claims, and appended drawings.

DETAILED DESCRIPTION OF PREFERRED EMBODIMENTS

Referring now to the drawings wherein like reference numerals designate corresponding parts throughout the several views, FIGS. 1-14 illustrating a mechanism for vehicle rear door articulation according to one embodiment, generally designated "rear door articulating and sliding mechanism 10."

Figure 1:
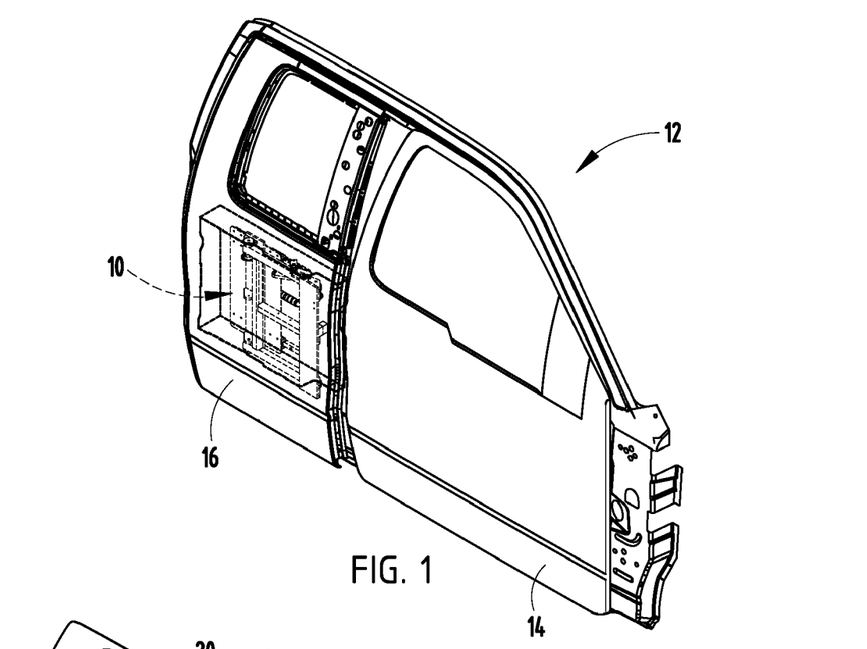
FIG. 1 is an isometric view of a door articulating and sliding mechanism for a vehicle rear door, according to one embodiment, showing the rear door closed and the hidden mechanism in phantom.
Figure 2:
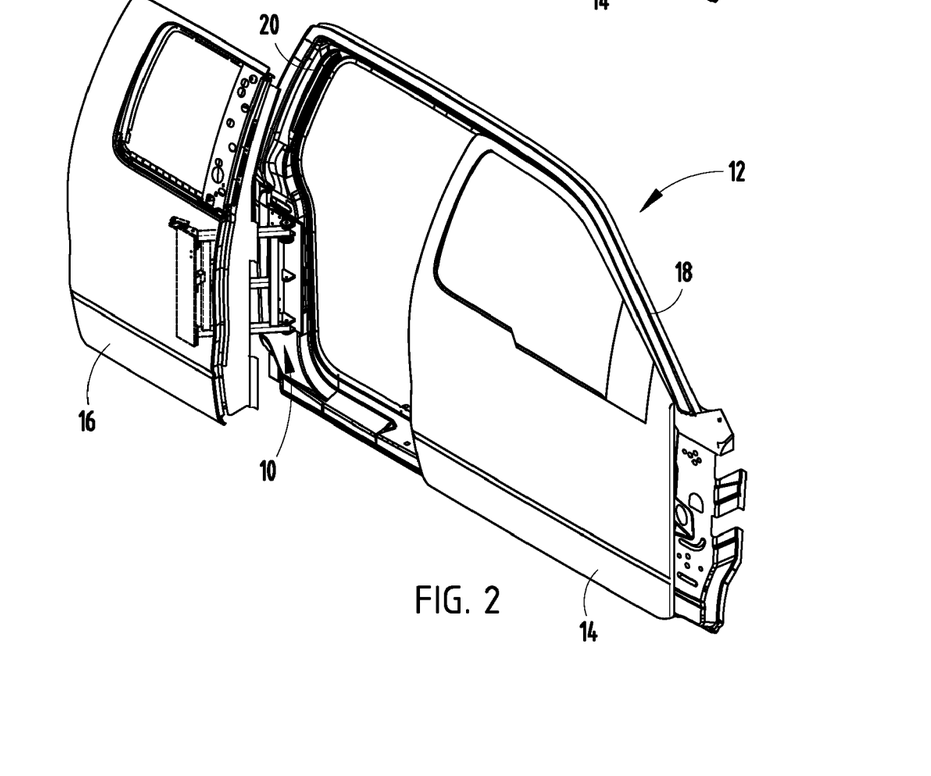
FIG. 2 is an isometric view of the door articulating and sliding mechanism, showing the rear door open.

Referring specifically to FIGS. 1 and 2, the rear door articulating and sliding mechanism 10 is generally shown mounted onto a vehicle 12 including front and rear doors 14 and 16. In the exemplary embodiment illustrated, the vehicle 12 may be a pick-up truck including A and C-pillars 18 and 20, and optimally may include a B-pillar (not shown) at a location where the front and rear doors 14 and 16 generally abut or closely meet when in the closed position. In order to facilitate effective ingress and egress into and from the passenger compartment of the vehicle 12, the rear door articulating and sliding mechanism 10 may allow for complete opening of the rear door 16 with an adjacent front door 14 being fully opened or closed, thus operating independent of the adjacent front door 14 and not requiring opening of the adjacent front door 14. While the door articulating and sliding mechanism 10 is shown configured on a rear door 16 adjacent to a front door 14, it should be appreciated that the mechanism 10 may be employed on either the front or rear door and may be employed in conjunction with a door with or without an adjacent door.

Figure 3:
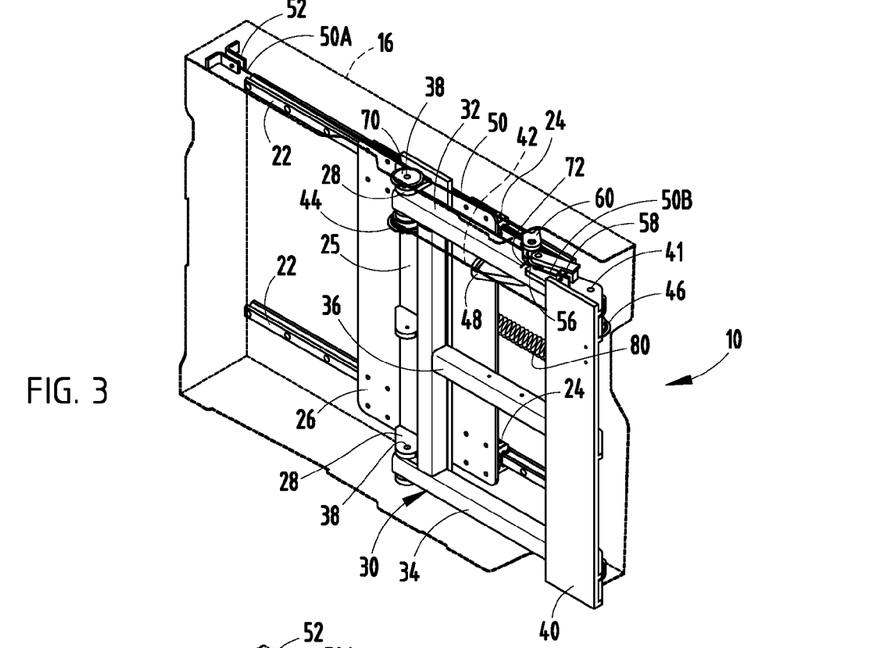
FIG. 3 is a perspective view of the vehicle door and articulating and sliding mechanism with the door shown in the closed position.
Figure 4:
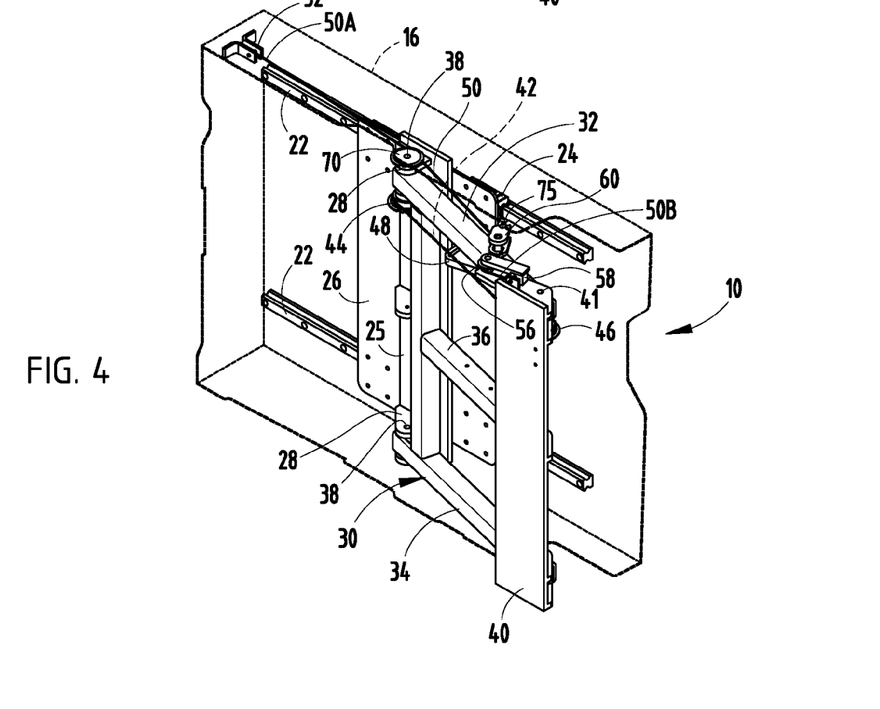
FIG. 4 is a perspective view of the vehicle door and articulating and sliding mechanism with the door shown in a partially open position.
Figure 5:
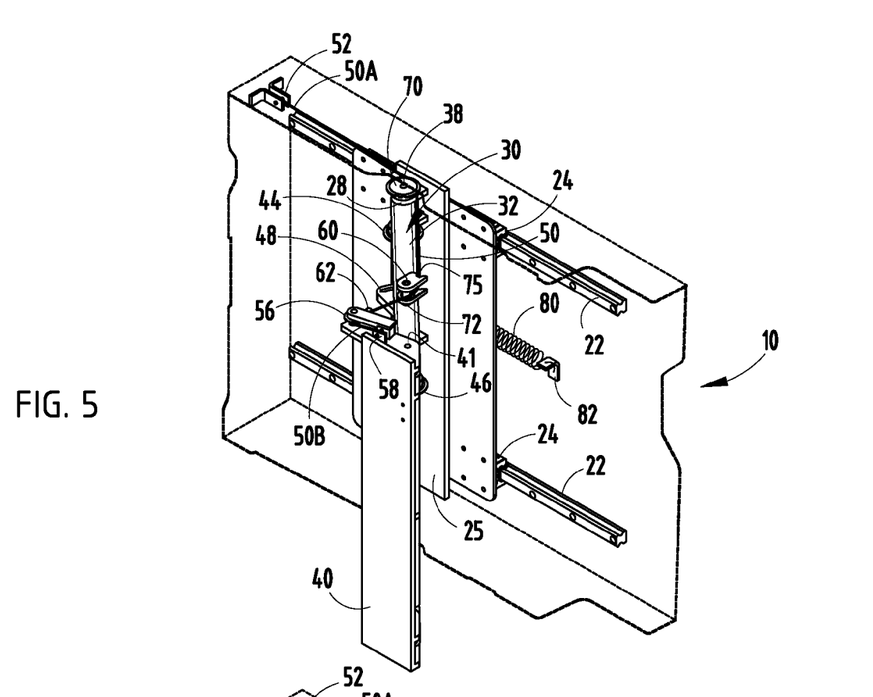
FIG. 5 is a perspective view of the vehicle illustrating the door in a further partially open position.
Figure 6:
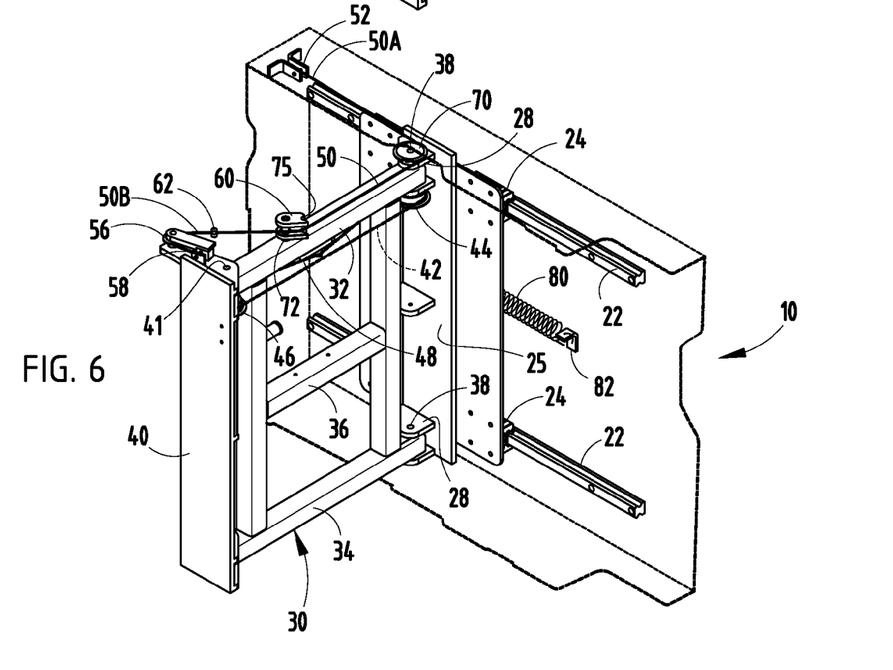
FIG. 6 is a perspective view of the vehicle door showing the door in a fully opened position.
Figure 7:
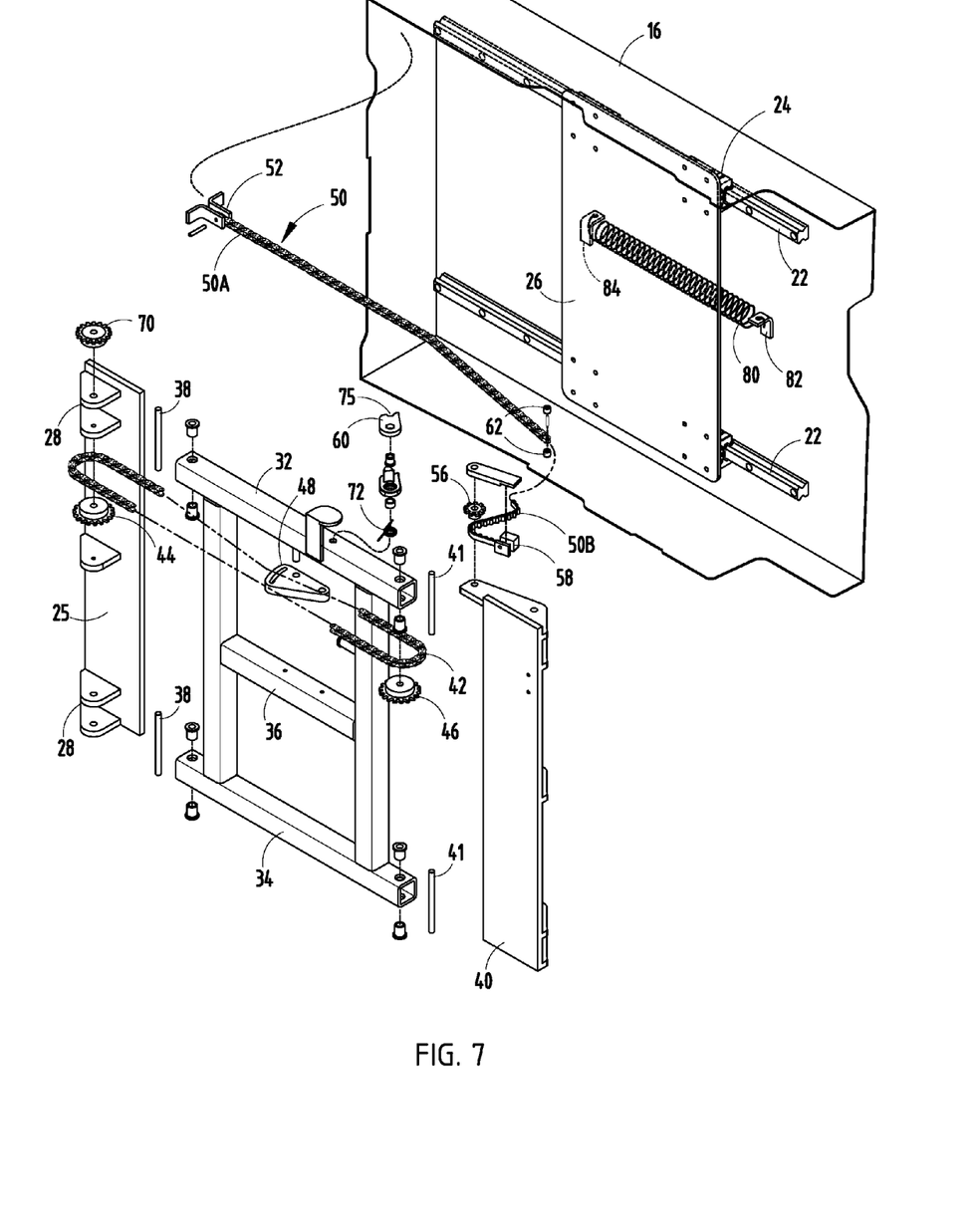
FIG. 7 is an exploded assembly view of the vehicle door articulating and sliding mechanism.

The rear door articulating and sliding mechanism 10 has a fixed bracket 40 as shown in FIG. 3 attached to a supporting structure of the vehicle 12 on the body side. According to one embodiment, the vehicle fixed structure is the C-pillar 20. The door articulating and sliding mechanism 10 is pivotally and slidably engaged at the opposite end to the vehicle door 16 such that the door 16 may rotate about a swing arm and slide between the closed position shown in FIG. 1 and the open position shown in FIG. 2.

With reference to FIGS. 1-7, the door articulating and sliding mechanism 10 includes a swing arm 30 generally shown having three horizontal bar elements 32, 34 and 36 interconnected by way of a pair of vertical bar elements. The swing arm 30 is pivotally connected at one end of the upper and lower horizontal bar elements 32 and 34 to the fixed first bracket 40 via pivot pins 41 which in turn is connected to the supporting structure (e.g., C-pillar) of the body side of the vehicle 12. The opposite end of the upper and lower horizontal bar elements 32 and 34 of swing arm 30 are pivotally connected via pivot pins 38 to a rotating second bracket 25 on a sliding plate assembly 26 which, in turn, is slidingly engaged to the vehicle door 16. The sliding plate assembly 26 is shown connected to rotating brackets 28. The pivot pins 38 and 41 allow pivotal motion of the swing arm 30.

The sliding plate assembly 26 has one or more rolling members 24 engaged to sliding rails 22 fixed to the inner side of the door 16. The sliding engagement on the sliding rails 22 may be made by way of sliding wheels or packs 24 which in turn are fixed to the sliding plate assembly 26. The sliding wheels or packs 24 may include one or more roller bearings, according to one embodiment. Alternately, the sliding wheels or packs 24 may include one or more ball bearings, according to another embodiment. Thus, the sliding wheels or packs 24 allow sliding movement of the rotating assembly 26 relative to the door 16.

The door articulating and sliding mechanism 10 further includes a first flexible link 42 shown in one embodiment generally positioned below the upper horizontal bar element 32 of the swing arm 30 and at least partially encircling a first sprocket 46 connected to the fixed first bracket 40 and at least partially encircling a second sprocket 44 connected to the rotating second bracket 25 of the sliding assembly 26. The first flexible link 42 may include a chain, according to one embodiment. The chain 42 may engage teeth on the sprockets 44 and 46.

According to another embodiment, the first flexible link 42 may comprise a belt, such as a timing belt. The first flexible link 42 serves as a 1:1 gear mechanism that links the fixed bracket 40 to the rotating bracket 25 and moves every time the door 16 moves to hold the orientation of the door 16 relative to the supporting structure. In addition, the first flexible link 42 includes a tensioning mechanism 48 for tensioning the first flexible link 42. The first and second sprockets 46 and 44 may each include a cam, according to another embodiment. The first flexible link 42 essentially anchors the door 16 to the body of the vehicle 12 and causes the door 16 to remain parallel to the body of the vehicle 12 as the swing arm 30 rotates through approximately one hundred twenty degrees (120°) of travel between the closed and open door positions.

The articulating and sliding mechanism 10 further includes a second flexible link 50 fixed to the vehicle door 16 at one end and fixed to the vehicle structure 20 at the opposite end. The second flexible link 50 may include a first portion 50A and a second portion 50B, according to one embodiment. The first portion 50A may include a chain and the second portion 50B may include a belt, according to one embodiment. According to other embodiments, the second flexible link 50 may include a single portion or multiple portions and each portion may be a belt, a wire or other flexible member. The second flexible link 50 engages a sprocket 70 and at least partially encircles a cam 60, and the second flexible link 50 provides a catch that engages the cam 60 to accelerate movement of the door 16 during the opening thereof. The catch is shown and described herein in one embodiment as a pin 62 that travels with the second flexible link 50 and engages a tooth 75 in the cam 60. It should be appreciated that movement of the door 16 is likewise decelerated during closing of the door 16.

The cam 60 is connected to the swing arm 30 and may comprise a salmon cam that has a surface that changes the acceleration and deceleration rate of the swing arm 30. The cam 60 has a tooth or slot 75 that engages a pin 62 that is part of or connected to the second flexible link 50. Pin 62 engages slot 75 when the swing arm 30 is in a position ranging from the closed door position to the fifteen degree (15°) open position, and thereafter is released or disengages from the cam 60. A spring 72 is provided to bias the cam 60 into a position to receive the pin 62 as the door 16 and swing arm 30 closes to an approximately fifteen degree (15°) open position.

In addition, a coil spring 80 is connected at one end to a latch 84 on sliding plate assembly 26 and at an opposite end to a bracket 82 on the vehicle door 16. The coil spring 80 biases the sliding plate assembly 26 generally toward the open door position to take up slack in the sliding engagement. It should be appreciated that the coil spring 80 may be an optional bias mechanism and that the spring 80 may bias the sliding plate assembly 26 toward the closed position, according to another embodiment.

Figure 8:
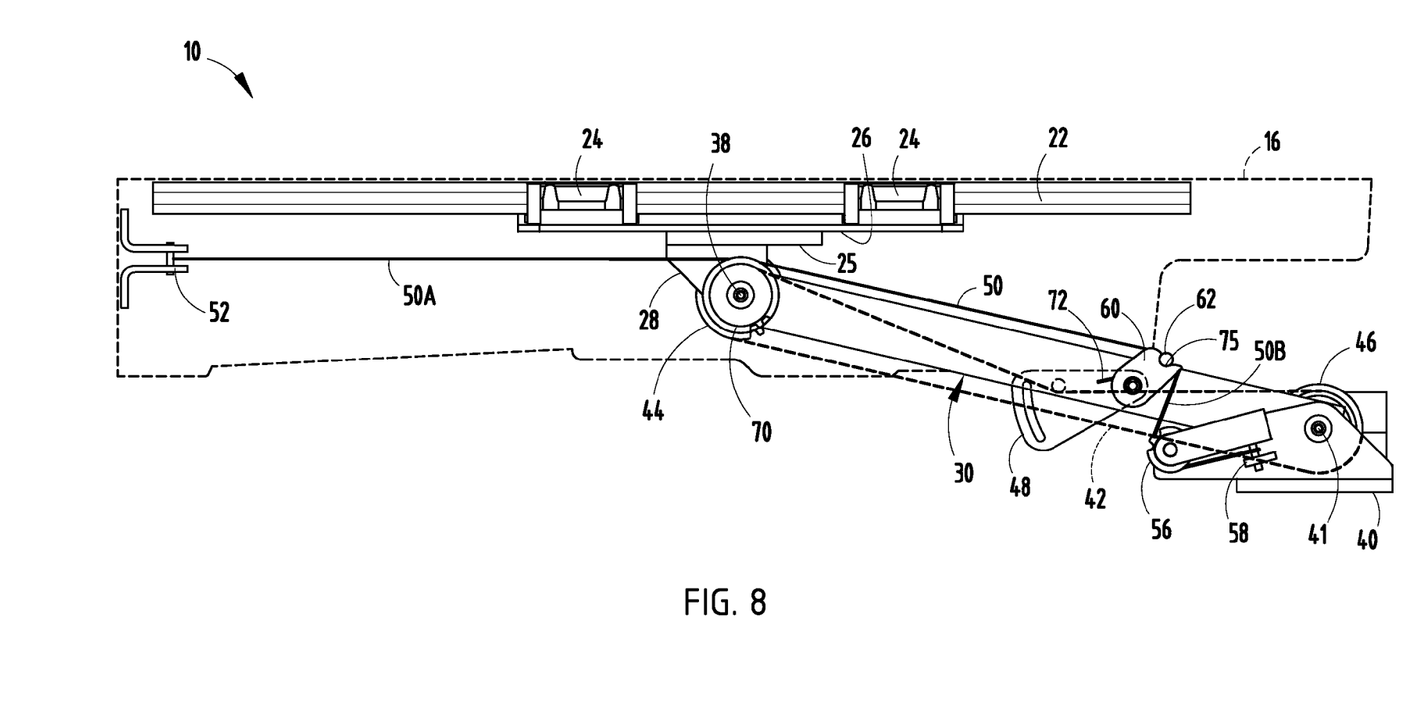
FIG. 8 is a top plan view of the vehicle body and door illustrating the door articulating and sliding mechanism with the door in the closed position.

Referring now to FIGS. 8-14, the articulating and sliding mechanism 10 is further illustrated in various positions including the closed position, the open position and various intermediate positions therebetween. As seen in FIG. 8, the door 16 is shown in the closed position, in which the door 16 generally fits flush with the adjacent outer body panels of the vehicle 12 and the adjacent door 14. As is shown in more detail, the second flexible link 50 is shown fixedly connected at one end to the vehicle door 16 by way of a connector 52, and is fixedly connected at the opposite end to the fixed bracket 40 at point 58. In the embodiment shown, the second flexible link 50 is made up of two portions 50A and 50B in which the first portion 50A connects between connector 52 and pin 62 and the second portion 50B connects from pin 62 to point 58. According to another embodiment, the second flexible link 50 may be made up of a single member (e.g., a single continuous chain or belt) having the pin or other catch member 62 attached or otherwise connected thereto.

The cam 60 is shown pivotally connected to the swing arm 30 and has an outer extending portion with a slot or tooth 75 configured to receive pin 62 such that the second flexible link 50 encircles the outer portion of the cam 60 when the door 16 is closed or in a near closed position. The cam 60 catches the pin 62 and forces the second flexible link 50 to pull the door 16 at an accelerated rate through the first fifteen degrees (15°) of opening of the swing arm 30 and door travel, according to one embodiment. Beyond fifteen degrees (15°) of opening, the pin 62 is pulled away from engagement with the cam 60. The second flexible link 50 holds the pin 62 in such a way that the tooth 75 in cam 60 will catch the pin 62 during closing of the door 16 in the reverse direction, such that the cam 60 causes deceleration of the door 16 during the final fifteen degrees of rotation of swing arm 30.

Figure 9:
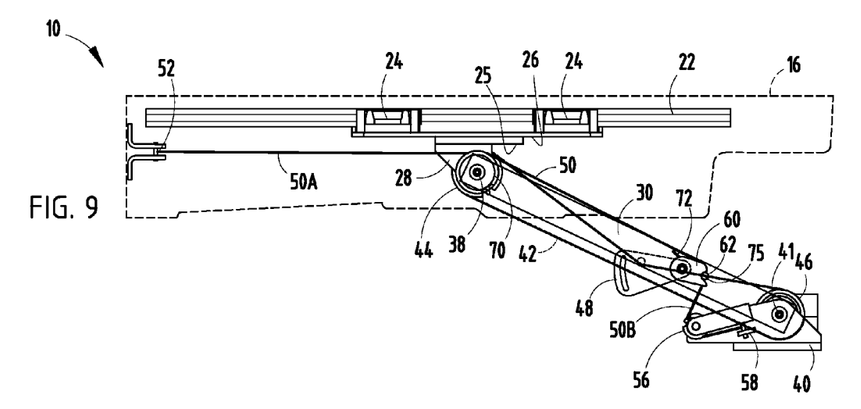
FIG. 9 is a top plan view of the vehicle body and door illustrating the door articulating and sliding mechanism with the door in a partially open position.

Referring to FIG. 9, the door 16 is shown with the swing arm 30 rotated approximately five degrees (5°) from the closed position such that the swing arm 30 rotates clockwise and the rotating bracket 26 slides relative to the door 16. With the swing arm 30 rotated five degrees (5°), the rotating bracket 25 and sliding plate assembly 26 maintain the parallel position with respect to the body of the vehicle 12 by use of the 1:1 ratio of the first flexible link (e.g., chain) 42. While a 1:1 chain drive rate ratio is provided, the sprockets may be employed as cams to achieve other drive rate ratios, according to other embodiments. As the swing arm 30 and door 16 rotate five degrees (5°), the second flexible link 50 becomes constrained and begins to slide the door 16 rearward. The cam 60 unwinds the belt 50 in such a way that the door 16 moves at an accelerated rate through the initial five degrees (5°) of opening. According to one example, the first five degrees (5°) of rotation translates the door approximately fifteen millimeters rearward.

Figure 10:
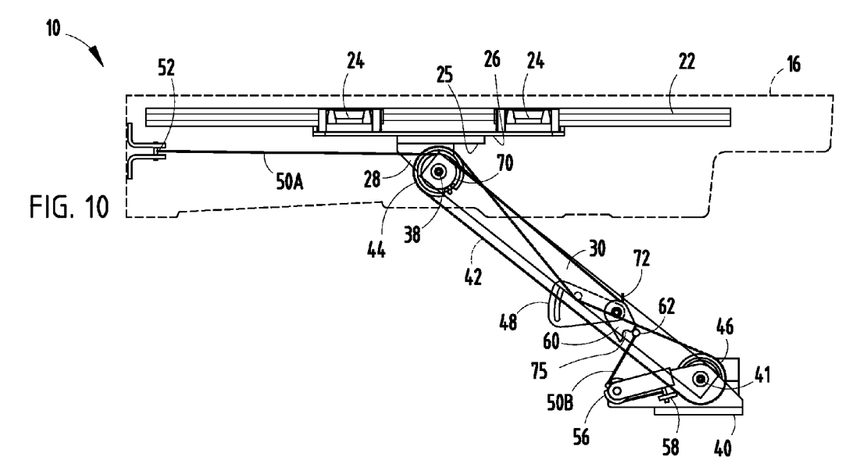
FIG. 10 is a top plan view of the vehicle body and door illustrating the door articulating and sliding mechanism with the door in a further open position.
Figure 11:
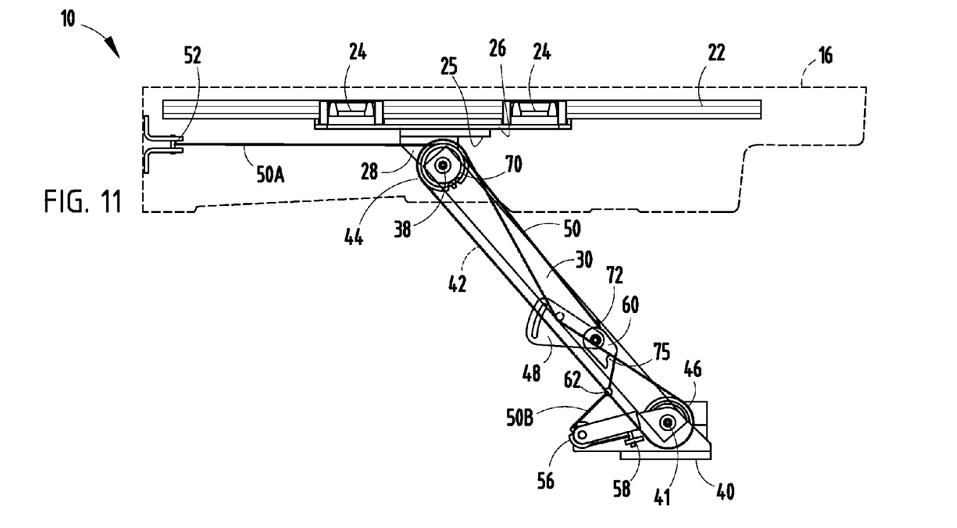
FIG. 11 is a top plan view of the vehicle body and door illustrating the door articulating and sliding mechanism with the door in a further open position.
Figure 12:
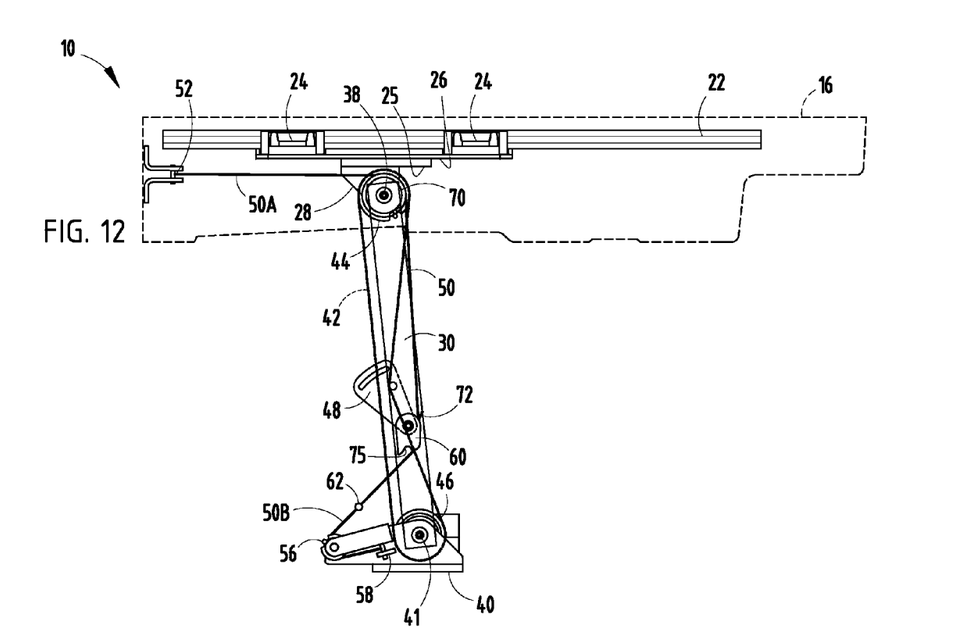
FIG. 12 is a top plan view of the vehicle body and door illustrating the door articulating and sliding mechanism with the door in a further open position.

Referring to FIG. 10, the door articulating and sliding mechanism 10 is further illustrated as the swing arm 30 and door 16 have moved ten degrees (10°) from the open position. In this position, the cam 60 has rotated and is substantially unwound fully from being in contact with the pin 62 such that the cam action and increased acceleration of the door slide has completed and the door begins to slide at a 1:1 ratio as the door continues to open and is held in parallel with the body of the vehicle by the drive chain 42. Referring to FIG. 11, the door articulating and sliding mechanism 10 is shown with the door opened approximately forty degrees (40°) relative to the closed position. In this position, the pin 62 has completely disengaged from cam 60 and the second flexible link 50 slides against the cam 60 as the door 16 continues to open and slide at a 1:1 ratio. In doing so, the door 16 moves further outward from the body of the vehicle 12 and slides relative to the mounting plate assembly 26 and rotating bracket 25. Referring to FIG. 12, the door articulating and sliding mechanism 10 is shown at approximately forty-five degrees (45°) relative to the closed position. In this position, the pin 62 is floating as the tension on the second flexible link 50 holds the pin 62 tightly in place. At this stage of the opening, the door 16 continues to open and slide at a 1:1 ratio.

Figure 13:
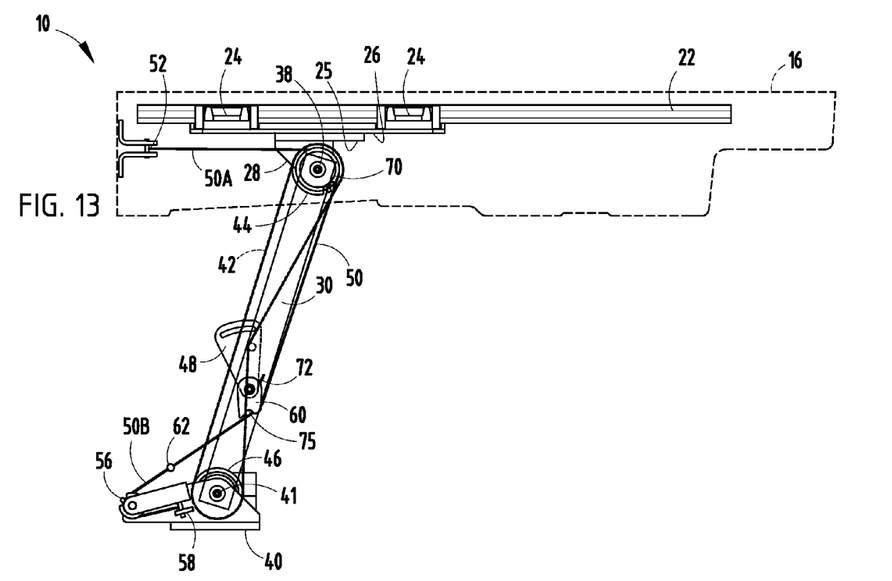
FIG. 13 is a top plan view of the vehicle body and door illustrating the door articulating and sliding mechanism with the door in a further open position.

Referring to FIG. 13, the door articulating and sliding mechanism 10 is shown at approximately ninety degrees (90°) relative to the closed position. In this position, the first and second flexible links 42 and 50 maintain contact with the corresponding sprocket and cam surfaces. Finally, in FIG. 14, the door articulating and sliding mechanism 10 is shown in the fully opened position at approximately one hundred twenty degrees (120°).

Figure 14:
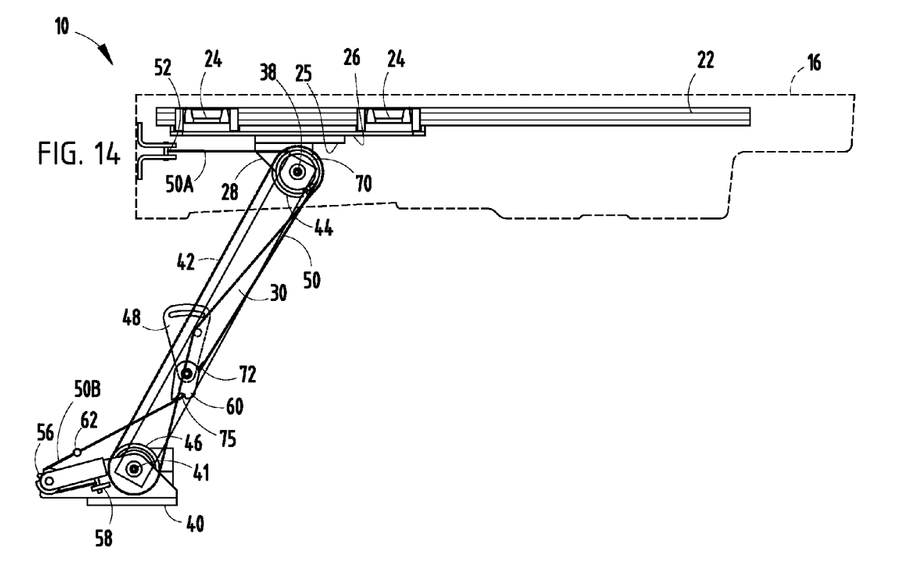
FIG. 14 is a top plan view of the vehicle body and door illustrating the door articulating and sliding mechanism with the door in the fully open position.

It should be appreciated that the door 16 closes in the opposite direction such that the swing arm 30 rotates counterclockwise from a position shown in FIG. 14 to the closed position shown in FIG. 8. In doing so, it should be appreciated that as the swing arm 30 and door 16 approach the fifteen degree (15°) relative to open position, the pin 62 engages the slot 75 of cam 60 such that the cam 60 is forced to rotate outward to decelerate movement of the door 16 from the fifteen degree (15°) position to approximately fully closed position. While a pin 62 and tooth 75 are shown providing a catch to engage the second flexible link 50 and cam 60 to accelerate and decelerate movement of the door 16, it should be appreciated that other catch mechanisms may be provided, according to other embodiments.

The vehicle door articulating and sliding mechanism 10 may be operative with a manually actuated door, according to one embodiment. According to another embodiment, the vehicle door articulating and sliding mechanism 10 may be operative with a powered door such as an electrical motor powered door.

It should be appreciated that the vehicle door articulating and sliding mechanism 10 advantageously allows the door to be independently opened (relative to a front door) and positioned away from the door opening to facilitate easier ingress and egress and allow maximum access for loading and unloading of transportable items. The mode of opening the door 16 is less likely to be constrained by parking lot restrictions that limit conventional door opening when adjacent to another vehicle or other object that prevents outward rotation of a door. Thus, parking lot entrapment is further reduced or avoided.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle door articulating and sliding mechanism comprising:
   a swing arm pivotally mounted via a first bracket to a vehicle structure at one end thereof;
   a sliding assembly comprising a rotating second bracket mounted at an opposite end of the swing arm, wherein the sliding assembly is slidably engaged to a vehicle door;
   a first flexible link at least partially encircling a first sprocket connected to the vehicle structure and a second sprocket fixed to the vehicle door; and
   a second flexible link fixed to the vehicle door at one end and fixed to the vehicle structure at the opposite end, said second flexible link at least partially encircling a cam, wherein the second flexible link and cam provide a catch that engages the cam to accelerate movement of the door during opening.

2. The mechanism as defined in claim 1, wherein the vehicle structure comprises a pillar.

3. The mechanism as defined in claim 2, wherein the pillar comprises a C-pillar.

4. The mechanism as defined in claim 1, wherein the cam is pivotally connected to the swing arm and the second flexible link comprises a pin for engaging the cam.

5. The mechanism as defined in claim 1, wherein the first flexible link comprises an endless chain.

6. The mechanism as defined in claim 1, wherein the second flexible link comprises at least one of a chain and a belt.

7. The mechanism as defined in claim 6, wherein the belt comprises a first chain portion and a second belt portion.

8. The mechanism as defined in claim 1 further comprising a tensioning mechanism for tensioning the first flexible link.

9. The mechanism as defined in claim 1, wherein the mechanism is employed on a truck, wherein the door is a rear door that pivots independent of an adjacent front door of the vehicle.

10. The mechanism as defined in claim 1, wherein the sliding assembly comprises a rail and one or more rolling members rollingly engaged to the rail.

11. A vehicle door articulating and sliding mechanism comprising:
    a swing arm pivotally mounted via a first bracket to a vehicle structure at one end thereof;
    a sliding assembly comprising a rotating second bracket mounted at an opposite end of the swing arm, wherein the sliding assembly is slidably engaged to a vehicle door;
    a first flexible link at least partially encircling a first sprocket connected to the vehicle structure and a second sprocket fixed to the vehicle door;
    a second flexible link fixed to the vehicle door at one end and fixed to the vehicle structure at the opposite end, said second flexible link at least partially encircling a cam; and
    a catch member that moves with the second flexible link and engages the cam to accelerate movement of the door during opening and to decelerate movement of the door during closing.

12. The mechanism as defined in claim 11, wherein the vehicle structure comprises a C-pillar.

13. The mechanism as defined in claim 11, wherein the cam is pivotally connected to the swing arm and the catch member comprises a pin for engaging a tooth in the cam.

14. The mechanism as defined in claim 11, wherein the first flexible link comprises an endless chain.

15. The mechanism as defined in claim 11, wherein the second flexible link comprises a first chain portion and a second belt portion.

16. The mechanism as defined in claim 11 further comprising a tensioning mechanism for tensioning the first flexible link.

17. The mechanism as defined in claim 11, wherein the mechanism is employed on a truck, wherein the door is a rear door that pivots independent of an adjacent front door of the vehicle.

18. The mechanism as defined in claim 11, wherein the sliding assembly comprises a rail and one or more rolling members rollingly engaged to the rail.

19. A vehicle component articulating and sliding mechanism comprising:
    a swing arm pivotally mounted via a first bracket to a vehicle structure at one end thereof;
    a sliding assembly comprising a rotating second bracket mounted at an opposite end of the swing arm, wherein the sliding assembly is slidably engaged to a vehicle component;
    a first flexible link at least partially encircling a first sprocket connected to the vehicle structure and a second sprocket fixed to the vehicle component; and
    a second flexible link fixed to the vehicle component at one end and fixed to the vehicle structure at the opposite end, said second flexible link at least partially encircling a cam, wherein the second flexible link and cam provide a catch that engages the cam to accelerate movement of the vehicle component in one direction and to decelerate movement of the vehicle component in an opposite direction.

* * * * *